US009649782B1

(12) United States Patent
Galomb

(10) Patent No.: US 9,649,782 B1
(45) Date of Patent: May 16, 2017

(54) INJECTION TUBE ASSEMBLY WITH INTEGRATED MATERIAL STRIPPING ELEMENT AND A POLYMER MIXING SYSTEM COMPRISING THE SAME

(71) Applicant: David E Galomb, Allentown, PA (US)

(72) Inventor: David E Galomb, Allentown, PA (US)

(73) Assignee: GALOMB, INC., Allentown, PA (US)

( * ) Notice: Subject to any disclaimer, the term of this patent is extended or adjusted under 35 U.S.C. 154(b) by 487 days.

(21) Appl. No.: 14/201,800

(22) Filed: Mar. 8, 2014

Related U.S. Application Data

(60) Provisional application No. 61/776,758, filed on Mar. 11, 2013, provisional application No. 61/776,765, filed on Mar. 11, 2013, provisional application No. 61/776,767, filed on Mar. 11, 2013, provisional application No. 61/777,500, filed on Mar. 12, 2013, provisional application No. 61/801,888, filed on Mar. 15, 2013.

(51) Int. Cl.
*B29B 7/80* (2006.01)
*B29C 45/17* (2006.01)
*B29C 45/47* (2006.01)

(52) U.S. Cl.
CPC .......... *B29B 7/802* (2013.01); *B29C 45/1753* (2013.01); *B29C 45/47* (2013.01)

(58) Field of Classification Search
CPC ....... B29C 45/47; B29C 45/1753; B29B 7/00; B29B 7/30; B29B 7/428; B29B 7/58; B29B 7/802; A21C 1/14; A21C 1/144
USPC ........ 366/309, 310, 312, 313, 255, 256, 332
See application file for complete search history.

(56) References Cited

U.S. PATENT DOCUMENTS 1,948,431 A * 2/1934 Rolph .................. A47J 43/105 366/243
3,009,686 A * 11/1961 Kaplan ................. A47J 43/105 366/276
3,115,664 A * 12/1963 Del Ponte ............ A45D 34/048 366/247
3,606,094 A * 9/1971 Mills .................... A61C 9/0026 222/145.6
3,661,363 A * 5/1972 Aletti ...................... B29B 7/421 366/149
4,676,655 A * 6/1987 Handler .............. B01F 11/0054 222/129
5,082,604 A * 1/1992 Valyi ....................... B29C 45/56 264/328.7
5,842,785 A * 12/1998 Brown ............... A61B 17/8825 366/139

(Continued)

OTHER PUBLICATIONS

Commercial Literature: The "Mini-Compounder KETSE 12/36" manufactured and sold by C.W. Brabender® Instruments, Inc. located in South Hackensack, New Jersey, USA.

(Continued)

*Primary Examiner* — Alison L Hindenlang
*Assistant Examiner* — Emmanuel S Luk

(57) ABSTRACT

An injection tube assembly comprising: a hollow cylindrical tube; a rotatable material stripping element, and a nozzle. Also, a polymer mixing system comprising: an injection tube assembly, a support apparatus for the injection tube assembly; a mixing apparatus; and if desired, an injection molding apparatus to produce an injection molded part with the mixed material.

19 Claims, 9 Drawing Sheets

(56) References Cited

U.S. PATENT DOCUMENTS

| | | | | | |
|---|---|---|---|---|---|
| 6,602,063 | B1 * | 8/2003 | Cardona | B29C 44/3446 425/135 |
| 7,070,318 | B2 * | 7/2006 | Renfro | B01F 7/1695 366/143 |
| 7,393,342 | B2 * | 7/2008 | Henniges | A61B 17/8822 222/327 |
| 8,967,854 | B2 * | 3/2015 | Sand | A61B 17/8833 366/189 |
| 9,060,826 | B2 * | 6/2015 | Coale | A61B 17/8822 |
| 2008/0304355 | A1 * | 12/2008 | Sattig | A61B 17/8825 366/133 |
| 2015/0164568 | A1 * | 6/2015 | Vogt | B01F 11/0054 606/94 |

OTHER PUBLICATIONS

Commercial Literature: The "LME Laboratory Mixing Extruder" manufactured and sold by Dynisco, located in Franklin, Massachusetts, USA.

Commercial Literature: The "LMM Laboratory Mixing Molder" manufactured and sold by Dynisco, located in Franklin, Massachusetts, USA.

Commercial Literature: The "RCP-0250 Microtruder" manufactured and sold by Randcastle Extrusion Systems, Inc., located in Cedar Grove, New Jersey, USA.

Commercial Literature: The "DSM Xplore 5ml Micro-compounder" manufactured and sold by DSM Xplore located in the Netherlands.

Commercial Literature: The "DSM Xplore Micro Injection Moulding Machine" manufactured and sold by DSM Xplore located in the Netherlands.

Commercial Literature: The "MicroInjector" manufactured and sold by DACA Systems located in Goleta, California, USA.

Commercial Literature: The "Microcompounder" manufactured and sold by DACA Systems located in Goleta, California, USA.

Commercial Literature: The "Thermo Scientific Haake MiniLab II Micro-Compounder" manufactured and sold by Thermo Scientific, located in Waltham, Massachusetts.

Academic paper entitled: "Improving Polymer Blend Dispersions in Mini-mixers" by Milan Maric and Christopher W. Macosko. Published in Polymer Engineering and Science, Jan. 2001, vol. 41 No. 1.

Academic paper entitled: "A Novel Miniature Mixing Device for Polymeric Blends and Compounds" by Martin Sentmanat, Savvas G. Hatzikiriakos, and Christos Stamboulides. Published by Polymer Engineering and Science 2009 vol. 49 Issue 11.

* cited by examiner

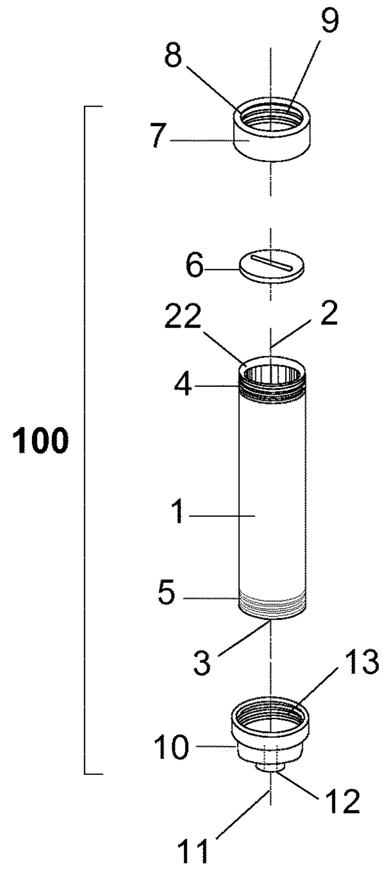
FIG. 1
FIG. 2
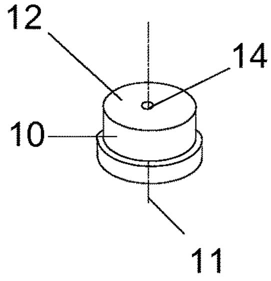
FIG. 3
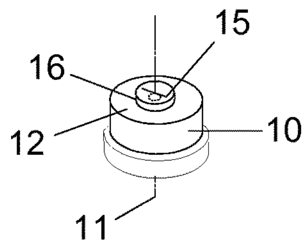
FIG. 4A
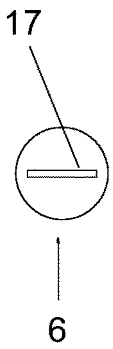
FIG. 4B
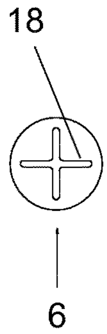
FIG. 4C
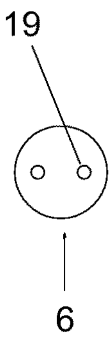

INJECTION TUBE ASSEMBLY WITH INTEGRATED MATERIAL STRIPPING ELEMENT AND A POLYMER MIXING SYSTEM COMPRISING THE SAME

CROSS-REFERENCE TO RELATED APPLICATIONS

This application claims priority under 35 U.S. Code §119 of U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, all of which are hereby incorporated by reference in their respective entireties.

This application is also related to applications entitled: Support Apparatus for Injection Tube Assembly; Material Stripping Apparatus for External Mixing Element; Mixing Tool with Integrated Material Stripping Element; System and Method for Mixing Polymers and Producing an Injection Molded Part, all filed on the same day as this U.S. Non-Provisional application and all hereby incorporated by reference in their respective entireties.

FIELD

The field relates to laboratory size apparatuses and systems for melting, mixing and processing polymers.

BACKGROUND

Polymers are often distinguished from other materials because they tend to have special challenges when mixing them, such as having to be melted at relatively high temperatures before they can be mixed, and often being very viscous and sticky in their molten state. Most polymers also have a narrow window in time to complete the mixing operation at the elevated temperature before they begin to degrade.

By and large polymers (e.g. thermoplastics) are mixed commercially via what is commonly referred to as continuous processing equipment, such as production type extruders and injection molding machines. Whereby the desired polymer is continually fed into such machines, usually along with some other additive, such as a colorant or filler, where it is melted and mixed with the said additive during the process of forming it into a desired shape, such as a plastic injected molded part, or an extruded profile.

These systems and machines work well for producing many parts very quickly, but are typically large in size, weighing thousands of pounds, and require extensive set-up time and rigorous process control to operate, and are very expensive.

These attributes also make them very difficult and inconvenient to use if one wishes to just make one part or a few parts for evaluation or testing purposes. Testing and evaluating a polymer before attempting to use it commercially in a product is almost always a prerequisite, so regardless of the cost and inconvenience, it is usually done.

Additionally, scientists and researchers are greatly hindered in their attempts to quickly develop and test new polymer formulations and mixtures when they are forced to use these large production machines to melt, mix and mold their test samples.

There are companies who have attempted to address this problem with varying degrees of success. Some have created essentially mini versions of production line equipment allowing it to be used in a laboratory environment to melt and mix the polymers and then either extrude the mixed material into a desired profile or form it into an injection molded part. Others have created stand alone machines and devices, also suitable for use in a laboratory environment to melt and mix a desired polymer, and then expel it in molten form, so the user can evaluate the mixed material. Although the line between a stand-alone melt and mixing machine and a mini-production system is somewhat blurred because some systems are comprised of multiple machines or apparatuses that are either used in cooperation with each other or attached together as add-on pieces of equipment for further downline processing of the mixed molten polymer.

Some equipment and systems known to the applicant for melting, mixing and processing polymers on a laboratory scale are as follows:

The "Mini-Compounder KETSE 12/36" manufactured and sold by C.W. Brabender® Instruments, Inc. located in South Hackensack, N.J., USA The "LME Laboratory Mixing Extruder" manufactured and sold by Dynisco, located in Franklin, Mass., USA The "LMM Laboratory Mixing Molder" manufactured and sold by Dynisco, located in Franklin, Mass., USA The "RCP-0250 Microtruder" manufactured and sold by Randcastle Extrusion Systems, Inc., located in Cedar Grove, N.J., USA The "DSM Xplore 5 ml Micro-compounder" manufactured and sold by DSM Xplore located in the Netherlands.

The "DSM Xplore Micro Injection Moulding Machine" manufactured and sold by DSM Xplore located in the Netherlands.

The "MicroInjector" manufactured and sold by DACA Systems located in Goleta, Calif., USA.

The "Microcompounder" manufactured and sold by DACA Systems located in Goleta, Calif., USA.

The "Thermo Scientific Haake MiniLab II Micro-Compounder" manufactured and sold by Thermo Scientific, located in Waltham, Mass.

Also known is an academic paper (published in Polymer Engineering and Science, January 2001, Vol. 41 No. 1) entitled: "Improving Polymer Blend Dispersions in Minimixers" by Milan Maric and Christopher W. Macosko. The researchers in that study evaluated several different laboratory size polymer mixing systems and machines on the market and compared them against each other, noting some of the shortcomings of each.

Although the apparatuses and systems on the market today may be suitable for their intended purposes, they all fall short of most users' desires in some way. The mini-production line systems are still very expensive and still require a significant amount of process control to operate. They are also cumbersome to clean and maintain and take up a lot of laboratory space. The stand-alone machines are also expensive and although smaller, they are also difficult to clean and maintain, plus they carry additional limitations and drawbacks, such as in some cases producing inferior mixing quality.

In any case, it is clearly evident there still remains a great unmet need for a simpler, more affordable, easier to operate, easier to clean and maintain, versatile, robust system that can melt, mix and process polymers in a laboratory environment with consistent high quality. What is disclosed hereafter is the answer to that great unmet need.

SUMMARY

An injection tube assembly comprising: a hollow cylindrical tube; a material stripping element, and a nozzle. Also, a system for mixing materials comprising: an injection tube assembly; an injection tube assembly support apparatus; a mixing apparatus; and if desired, an injection molding apparatus to produce an injection molded part with the mixed material contained in the injection tube assembly.

Each apparatus will first be described in detail, and then it will be described how they cooperate with each other in a system. Then, some alternative embodiments and advantages will be described.

BRIEF DESCRIPTION OF THE DRAWINGS

FIG. 1 illustrates an exploded isometric view of an injection tube assembly in one embodiment.

FIG. 2 illustrates an isometric view of a nozzle cap in one embodiment.

FIG. 3 illustrates an isometric view of a nozzle cap in one embodiment.

FIGS. 4A, 4B and 4C each illustrate the top view of a material stripping element in an alternative embodiment.

DETAILED DESCRIPTION

Injection Tube Assembly

Figure 5:
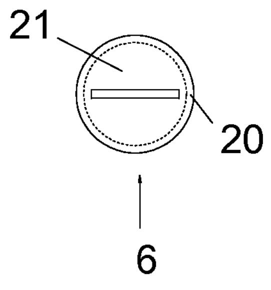
FIG. 5 illustrates the top view of a material stripping element in one embodiment, comprising a frangible periphery.

FIG. 1 illustrates an injection tube assembly 100 in one embodiment, comprising a hollow cylindrical tube 1 with an open top end 2 and an open bottom end 3 and is typically constructed of metal, plastic, glass or any combination thereof. The choice of materials substantially depends on what particular material will be mixed in the said tube 1, as well as the intended purpose of the user. Also, what mechanical forces and temperature the said tube 1 and overall assembly 100 will likely be exposed to when it is being employed within the disclosed system. For example, metal might be selected for both its high mechanical strength and resistance to high temperatures. Plastic might be selected for its low cost or disposability, where high temperatures are not required. Glass (e.g. borosilicate) might be selected if the user desires to observe the mixed (or partially mixed) material while it is in the tube 1, yet still have the ability to expose the said tube 1 to relatively high temperatures. In the embodiment of FIG. 1, which is exemplary and not a limitation, the said tube 1 is metal, and also comprises external threads 4 at its top end 2 and external threads 5 at its bottom end 3.

Continuing to refer to FIG. 1, a material stripping element 6, which in one embodiment comprises the shape of a thin round disc, is placed over the top end 2 of the tube 1 in close communication with the peripheral top edge of said tube 1, effectively covering the tube 1 opening. An end cap 7, which in one embodiment, has a substantially open area on its top surface 8 and internal threads 9 secures to the threaded top 4 end of the tube 1, such that the stripping element 6 is interposed between. Once attached, the said stripping element 6 is still able to rotate freely on top of the tube 1, but remains captive underneath the cap 7, because the said open area of the top surface 8, which in this embodiment is circular in shape, is slightly smaller than the outside diameter of the stripping element 6. The said end cap 7 may be constructed of metal, plastic, or another desired material or combination of materials.

The choice of materials for constructing the cap 7 primarily depends on the requirements of the user. For example: heat resistance, mechanical strength, non-stick properties, lubricity, cost, ease of attachment and removal, compatibility with the materials intended to be mixed in the tube 1, would all be typical considerations when selecting the ideal material to construct the end cap 7.

It should be noted at this point, in an alternative embodiment, the stripping element 6 may instead fit into a groove (not shown) machined or otherwise fabricated into the inside surface of the said tube 1 very near its top end 2, whereby the said element is held captive therein around its periphery, but still able to rotate freely, thereby obviating the need for a cap 7 to hold the said element 6 captive in close communication with the tube 1. The said alternative embodiment of the element 6 will be described later in more detail.

A nozzle cap 10 with an orifice 11 centered on its bottom surface 12 and with internal threads 13 secures to the external threads 5 on the bottom end 3 of the tube 1. The said nozzle cap 10 may be constructed of metal, plastic, or another desired material or combination of materials, and like the end cap 7, the material of choice for constructing the nozzle cap 10 primarily depends on the requirements of the user. The orifice 11 of the nozzle cap 10 may be of any desired size or shape to suit a particular application. For example, as illustrated in FIG. 2, it may simply be a round through hole 14 drilled or otherwise fabricated into the bottom surface 12 of the nozzle cap 10. Or, alternatively, as illustrated in FIG. 3, it may be more elaborate and also comprise a flexible element 16, such as a rubber disc, comprising at least one slit 15, and typically bonded to the bottom surface 12 of the said nozzle cap 10, directly over the orifice 11. Whereas, the said flexible element 16 in one embodiment keeps the orifice 11 effectively closed off until enough pressure or force is applied against it from inside the tube 1, causing the said slit 15 to spread apart, allowing the materials inside the tube 1 to be expelled therefrom, and then close back up after said force is terminated, allowing whatever materials that remain in the said tube 1 to stay contained therein. The said flexible element 16 feature may be desirable when mixing a lower viscosity material, to prevent it from drooling from the nozzle orifice 11 during the mixing operation.

Referring back to the material stripping element 6; the said element 6 also comprises a through hole of a desired geometry, preferably constructed to accommodate the insertion and withdrawal of an external mixing element with a predetermined close fit, which will be explained in more detail later. FIG. 4A illustrates one such hole configuration in the shape of a slot 17. FIG. 4B illustrates another such hole configuration in the shape of a cross slot 18. FIG. 4C illustrates yet another such hole configuration in the shape of multiple holes 19. The aforementioned hole configurations 17, 18, 19 in FIGS. 4A, 4B, 4C are merely exemplary and not a limitation.

In another embodiment, as illustrated in FIG. 5, the stripping element 6 comprises a frangible periphery 20, such that when a predetermined amount of force is applied to the said element 6 from above, its center portion 21 breaks way from the periphery 20 portion, causing the said center portion 21 to be pushed into the tube 1. Alternatively, or in combination with the said applied force from above, some other desired action may also cause or otherwise facilitate the separation of the center portion 21 of the element 6 from its periphery 20. For example, the end cap 7 may comprise a sharp edge or blade (not shown) around its inner periphery, such that when the said cap 7 is tightened to a certain point on the tube 1, the said sharp edge or blade bears down on the stripping element 6 and severs the inner portion 21 from the periphery 20. So for example, in one exemplary embodiment, the stripping element 6 is placed on top of the tube 1, resting on its periphery 20. Then, the cap 7 is screwed onto the tube 1 to position #1, which would be sufficiently tight enough to keep the element 6 captive between the cap 7 and the tube 1, but still allow enough room for the element 6 to rotate freely. Then at a desired time, which will be explained later, the said cap 7 is further tightened to position #2, which would cause the said sharp edge extending from a desired inside surface of the cap 7 to bear down on the element 6 to effectively separate its center portion 21 from its periphery 20.

Figure 6A:
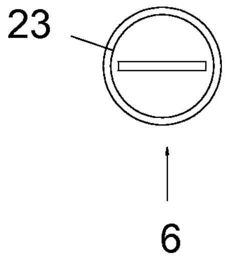
FIG. 6A illustrates the top view of a material stripping element in one embodiment, comprising a score line.
Figure 6B:
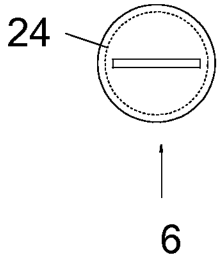
FIG. 6B illustrates the top view of a material stripping element in one embodiment, comprising perforations.

It shall be appreciated; the said element 6 may also comprise various features to facilitate this said separation. For example, FIG. 6A illustrates the top view of the element 6 in one embodiment comprising a score line 23 near its outer periphery 20 (see FIG. 5) to facilitate separation at the desired location. Likewise, FIG. 6B illustrates the top view of the element 6 in another embodiment comprising perforations 24 near its outer periphery 20 (see FIG. 5) to facilitate separation at the desired location. Indeed, the tube 1 itself if desired may comprise various features to facilitate a desired function. For example, the tube 1 may comprise a chamfer 22 (See FIG. 1), notch or similar means around the inner periphery of its top edge to effectively cradle the material stripping element 6, and keep it centered over the tube 1 opening, yet not impede its ability to rotate freely.

Figure 7:
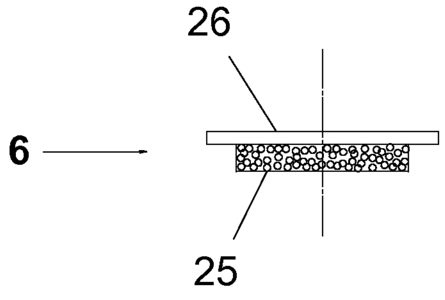
FIG. 7 illustrates the side of the material stripping element in one embodiment, comprising a composite of materials.

Like the end cap 7 and nozzle cap 10, the material stripping element 6 may be constructed from various materials to best suit the user's particular application. For example, in one embodiment, the said element 6 may be fabricated from metal to resist high temperatures and also be long lasting. In an alternative embodiment, the element 6 may be fabricated from a desired plastic such as PTFE because of its non-stick properties and ease of cleaning. In yet another embodiment, the element 6 may be fabricated from a combination of materials to achieve the best result, such as a smaller metal disc bonded to a larger plastic disc, whereby the smaller metal disc serves as the rigid center portion 21 of the said element 6 and the larger plastic disc serves as its frangible outer periphery 20. Furthermore, as illustrated in FIG. 7, it may be desirable to bond a material 25 or materials to the element 6 to optimize it for a particular material being mixed and/or for a particular mixing element being employed. For example, when the stripping element 6 is constructed of metal, a soft silicone rubber might be bonded to its surface to help prevent molten polymer from sticking to it, and also protect the mixing element from being damaged by the metal edges of the through hole (e.g. 17, 18, 19) as it feeds through it. Such a material 25 may also serve as a means to make the through hole (e.g. 17, 18, 19) more closely conform to the shape of a mixing element, thereby improving its stripping effectiveness, which may be particularly desirable when the mixing element employed comprises a contoured geometry, such as helically shaped blade or ribbon.

In any event, in one embodiment, as is evident by viewing FIG. 7, the incorporation of a material 25 results in the element 6 being substantially thickened, except for around its periphery 20, which now essentially functions as the lip or similar flange portion of the element 6 that rests upon the top peripheral edge of the tube 1, or alternatively is held captive in an internal groove in the said tube 1 near its top end 2. Some said materials 25 suitable for this purpose, without limitation, may include: cloth and other fibrous and non-woven materials, compressed metal wool, rubber, silicone, and plastic. Different types of materials 25 may also be combined with each other to achieve a desired function.

Injection Tube Assembly Support Apparatus

Figure 8:
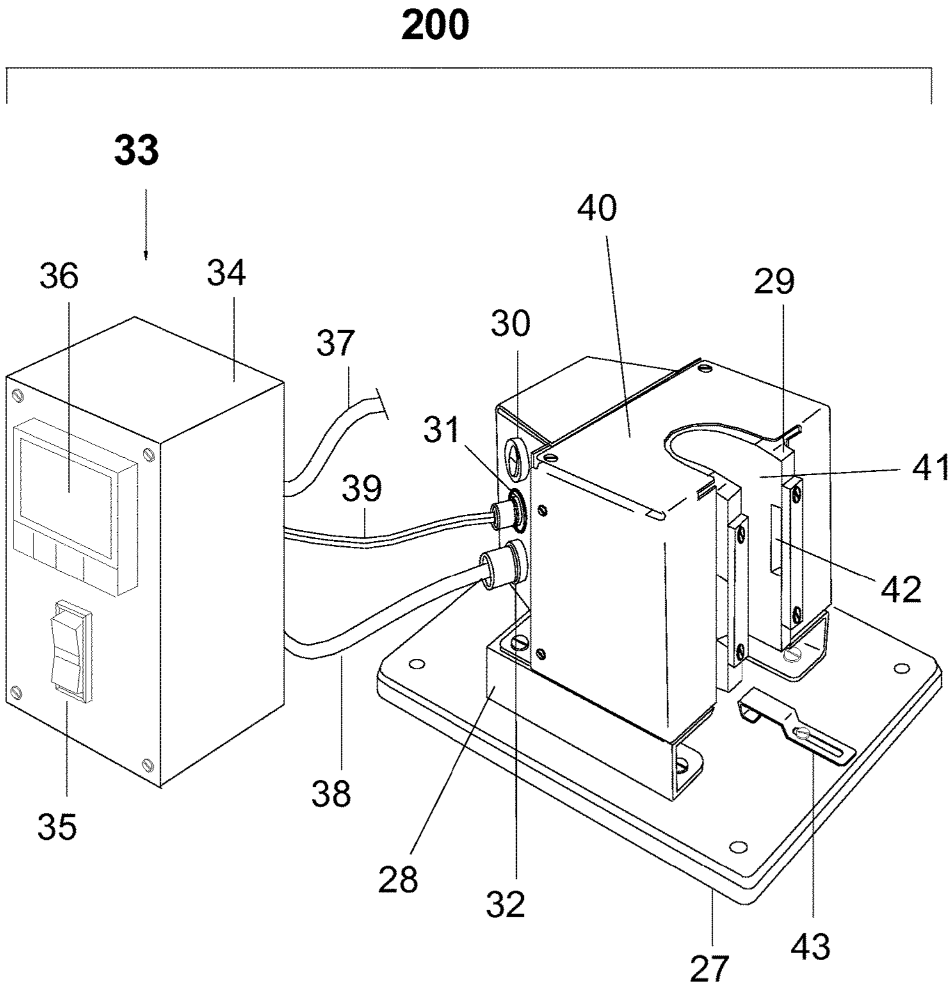
FIG. 8 illustrates an isometric view of an assembled injection tube assembly support apparatus in one embodiment.

FIG. 8 illustrates an isometric assembled view of one embodiment of the injection tube assembly support apparatus 200 comprising: a base plate 27; a mounting platform 28; a receiving block 29; a heating element (not visible); a power/breaker switch 30; a sensor wire input receptacle 31; a power input receptacle 32; a thermocouple sensor (not visible) attached to the receiving block 29; a protective enclosure 40; and an electronic control device (ECD) 33 comprising: an enclosure 34; a power switch 35; a PID controller with digital temperature display 36; a mains power cord 37; a power output cord 38, a sensor wire 39. The receiving block 29 is characterized by a receiving slot 41 with notches 42 to accommodate receiving, securing and supporting the injection tube assembly 100 to the said apparatus 200. If desired, the apparatus 200 may also comprise a stopper element 43 mounted to the base plate 27. The said apparatus 200 will be further described later in the Applicant's explanation of the system.

Detailed alternative embodiments of the apparatus 200 and related information are also disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Support Apparatus for Injection Tube Assembly; Material Stripping Apparatus for External Mixing Element; Mixing Tool with Integrated Material Stripping Element; System and Method for Mixing Polymers and Producing an Injection Molded Part, all of which were filed on the same day as this U.S. Non-Provisional application, and are hereby incorporated by reference in their respective entireties.

Mixing Apparatus

A mixing apparatus suitable for use within the present system may comprise any number of alternative embodiments, provided it comprises a mixing element that suitably cooperates with the material stripping element 6 and is capable of effectively mixing the material contained in the injection tube 1.

Figure 9:
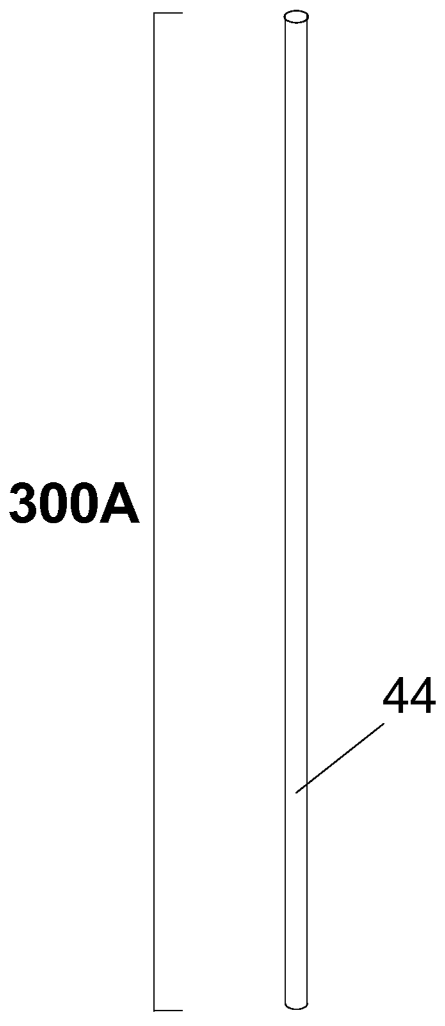
FIG. 9 illustrates an isometric view of a mixing apparatus in embodiment A.

Accordingly, FIG. 9 illustrates one embodiment of the mixing apparatus 300A, which simply comprises a mixing element 44 in the shape of cylindrical rod, also commonly referred to as a stirring rod.

Figure 10:
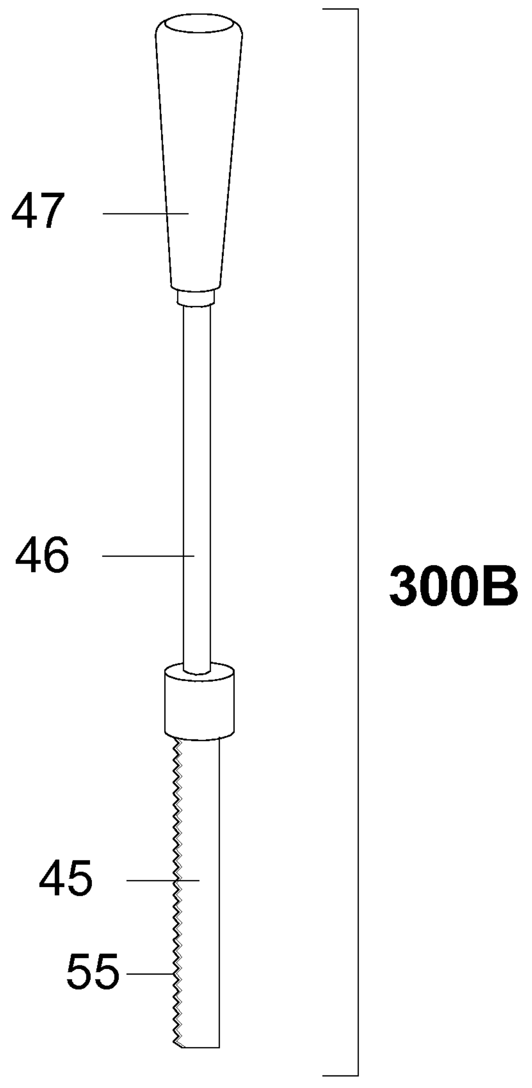
FIG. 10 illustrates an isometric view of a mixing apparatus in embodiment B.

FIG. 10 illustrates an alternative embodiment of the mixing apparatus 300B that is somewhat more sophisticated, comprising: a mixing element 45; a shaft 46; and a handle 47.

Figure 11:
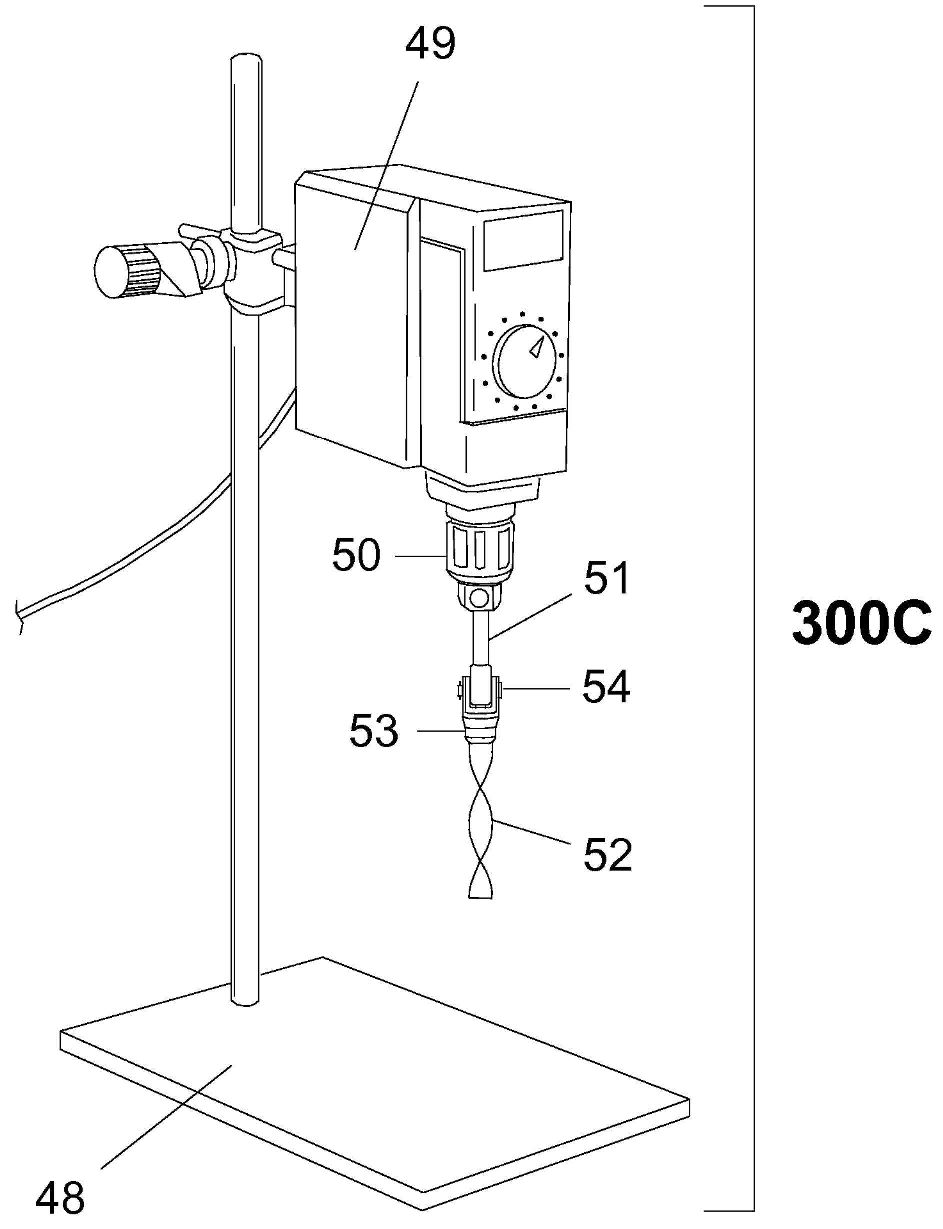
FIG. 11 illustrates an isometric view of a mixing apparatus in embodiment C.

FIG. 11 illustrates yet another alternative embodiment of the mixing apparatus 300C that is even more sophisticated, comprising: a support structure 48; a motorized overhead mixer 49 with a collet or chuck 50; a shaft 51; and a mixing element 52. The said mixing element 52 in this exemplary embodiment is a helical blade, which also comprises a clevis 53 allowing it to be easily separated from the shaft 51 by simply removing a clevis pin 54 therefrom. Motorized overhead mixers 49 of the type illustrated in FIG. 11 are readily available in the marketplace, so details of its construction and operation are not necessary. However, one such overhead mixer 49 that has been found to be suitable for use in the present system is the Model BDC1850 overhead stirrer, manufactured by Caframo limited, located in Ontario, Canada.

It shall be appreciated, the geometry and construction of the aforementioned mixing elements 44, 45, 52 are not a limitation, and numerous other shapes and configurations may be employed in the present system to achieve the best mix of a desired material. In addition, a desired mixing element (e.g. 44, 45, 52) may comprise various other features and enhancements, such as adding serrations 55 to one or more edges as is shown on the mixing element 45 in FIG. 10, or plating or coating the said element 44, 45, 52 to make its surface more non-stick and/or resistant to corrosion, or other modifications, such as magnetizing the said element 44, 45, 52 to for example, cause a ferromagnetic filler to flow differently as it mixes in with a molten polymer. The mixing apparatus 300 may also comprise multiple mixing elements if desired, such as without limitation, two spaced apart cylindrical rods attached to a single shaft and handle. As previously mentioned, the material stripping element 6 is likewise preferably constructed to accommodate the geometry of the mixing element being employed. So, for example a mixing element comprising two spaced apart rods would likely be accommodated by a stripping element 6 comprising two spaced apart holes 19, and mixing element comprising a flat blade 45 or alternatively a helical blade 52 geometry would most likely be accommodated by a stripping element 6 comprising a slotted through hole 17. The said apparatus 300 will also be further described later in the Applicant's description of a system.

Detailed alternative embodiments of the apparatus 300 and related information are also disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Support Apparatus for Injection Tube Assembly; Material Stripping Apparatus for External Mixing Element; Mixing Tool with Integrated Material Stripping Element; System and Method for Mixing Polymers and Producing an Injection Molded Part, all of which were filed on the same day as this U.S. Non-Provisional application, and are hereby incorporated by reference in their respective entireties.

Injection Molding Apparatus

Figure 12:
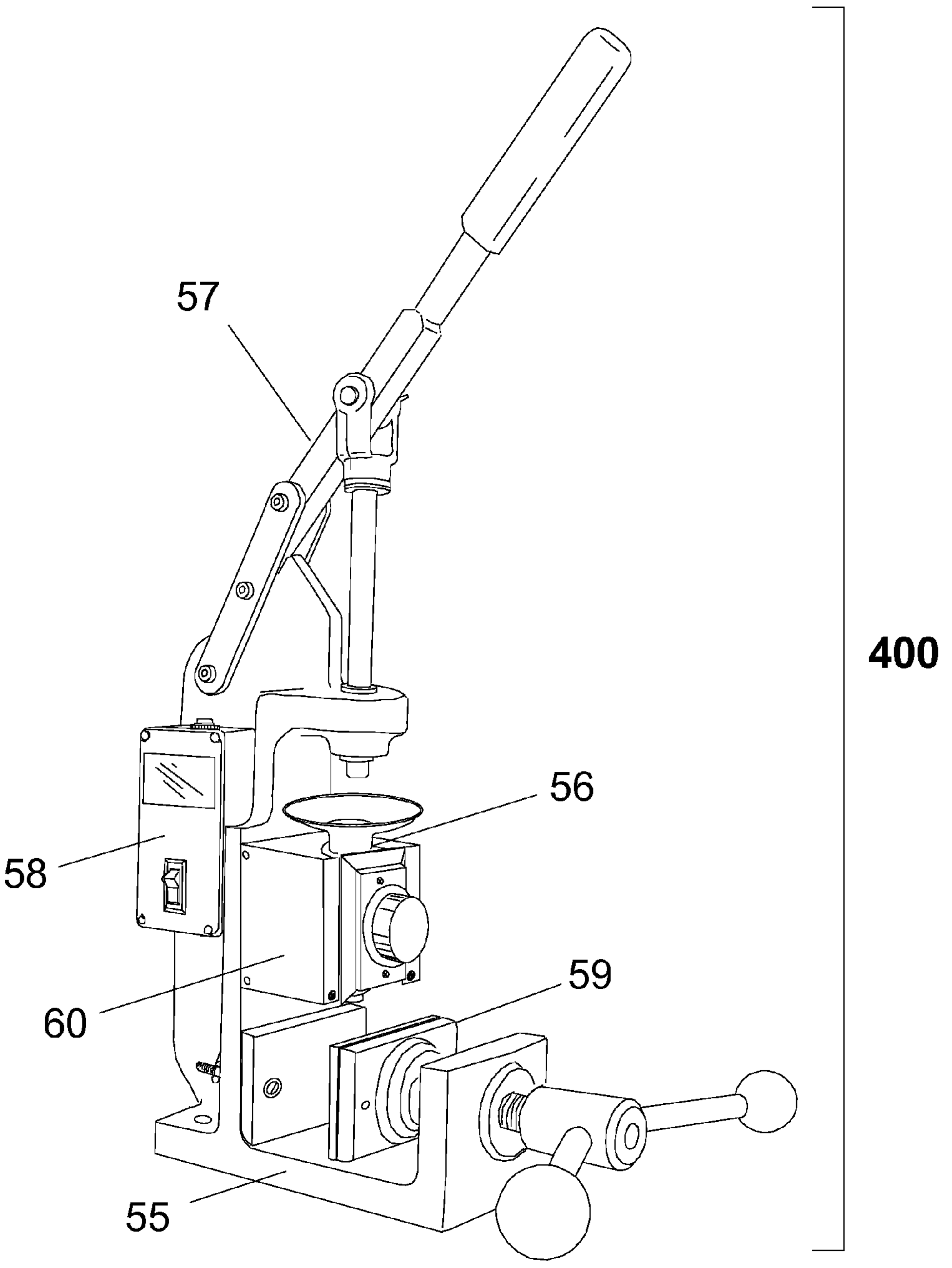
FIG. 12 illustrates an isometric view of an assembled injection molding apparatus in one embodiment.

FIG. 12 illustrates an isometric view of one embodiment of an assembled injection molding apparatus 400 that is particularly suitable for use within the present system. The apparatus 400 comprises a main support structure 55; a the heating and injection unit assembly 56; a handle assembly 57; a control box assembly 58; a mold clamping means 59; electrical communication between at least the control box assembly 58 and the heating and injection unit assembly 56; a protective enclosure 60. The said apparatus 400 will be further described below in the Applicant's description of a system.

Detailed alternative embodiments of the apparatus 400 and related information are also disclosed in U.S. Provisional Application Ser. Nos. 61/776,758 and 61/776,765 and 61/776,767 all filed on Mar. 11, 2013, and 61/777,500 filed on Mar. 12, 2013, and 61/801,888 filed on Mar. 15, 2013, and the co-pending U.S. Non-Provisional Applications entitled: Support Apparatus for Injection Tube Assembly; Material Stripping Apparatus for External Mixing Element; Mixing Tool with Integrated Material Stripping Element; System and Method for Mixing Polymers and Producing an Injection Molded Part, all of which were filed on the same day as this U.S. Non-Provisional application, and are hereby incorporated by reference in their respective entireties. In addition, detailed descriptions and various alternative embodiments of the injection molding apparatus 400 are also disclosed in U.S. Pat. Nos. 8,616,871; 8,070,469; 7,494,332 and D559,285 along with their preceding provisional applications and continuations extending therefrom. All of which are incorporated herein by reference in their respective entireties.

System

In one embodiment, a system comprises: a mixing apparatus 300 comprising a mixing element (e.g. 44, 45, 52); and an injection tube assembly 100 comprising a hollow cylindrical tube 1, a rotatable material stripping element 6 and a nozzle 10, removably secured in a support apparatus 200, whereby material contained in the tube 1 is mixed by the mixing element (e.g. 44, 45, 52) portion of the mixing apparatus 300, and material residue is removed from the mixing element (e.g. 44, 45, 52) by the material stripping element 6 as the said mixing element (e.g. 44, 45, 52) is withdrawn from the said injection tube 1. If desired, the injection molding apparatus 400 may also be employed within a system to produce an injection molded part with the mixed material after completing the mixing operation.

Figure 13:
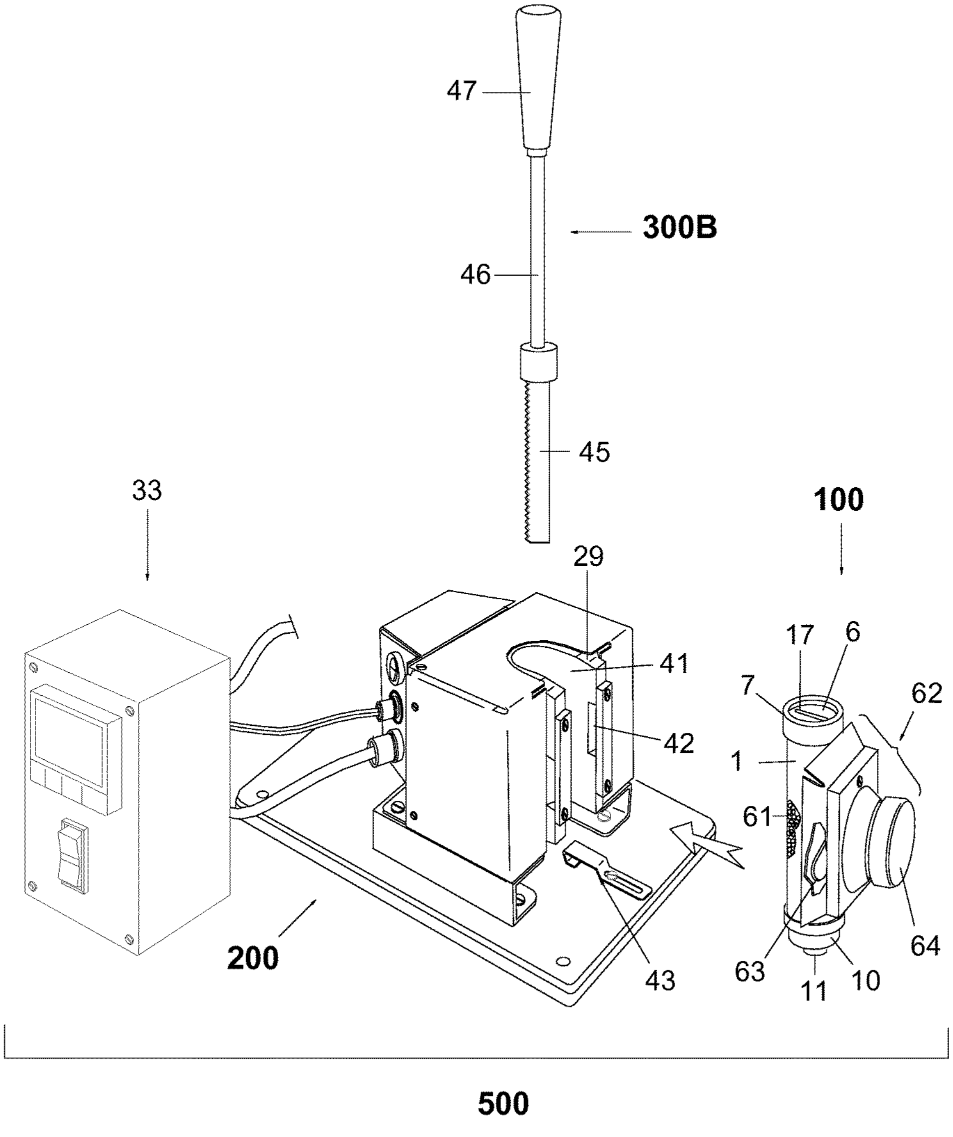
FIG. 13 illustrates an isometric view of a system in one embodiment.

Accordingly, FIG. 13 illustrates one embodiment of a system 500 that is particularly suitable for use in the marketplace where the injection tube assembly 100; the injection tube assembly support apparatus 200; and the mixing apparatus 300 are provided, with the said assembly 100 removably secured in the support apparatus 200. However, is shown in FIG. 13 separated therefrom to better illustrate the individual elements thereof.

As such, FIG. 13 illustrates the injection tube assembly 100 assembled with the nozzle cap 10 secured to the threaded bottom of the tube 1, and the top cap 7 secured to the threaded top end of the tube 1 with the material stripping element 6 interposed and held captive in between the said tube 1 and cap 7, yet still having enough room to rotate freely within its captive space. The said element 6 in this exemplary illustration also having a through hole in the shape of a slot 17 as previously illustrated in FIG. 4A. The said tube 1 also containing the material 61 (cut-away view) desired to be mixed, having been placed therein before the element 6 and top cap 7 were secured to the said tube 1. The said tube 1 in this illustration also comprises a latching and gripping assembly 62, which is removably attached thereto. When the injection tube assembly 100 is inserted into the receiving slot 41 of apparatus 200, the latching mechanism 63 (cut-away view) of the assembly 62 interlocks with the notches 42 of the receiving block 29 by turning the knob 64, thereby keeping the said assembly 100 secured in the apparatus 200. When desired, the said knob 64 may then be simply turned the other way to release the interlock, allowing the assembly 100 to be removed from the apparatus 200. However, it shall be appreciated incorporating the latching assembly 62 into the assembly 100 is not a requirement. The preassembled tube 1, stripping element 6, end cap 7, and nozzle cap 10 portion of the assembly 100 could easily be placed in the slot 41 first, and then the said latching assembly 62 portion inserted afterward, and then secured to the apparatus 200. Or, in an alternative embodiment, where the support apparatus 200 comprises a receiving hole (not shown) rather than a slot 41, no such latching mechanism 63 or knob 64 may be needed. However, in this instance, illustrating the assembly 100 with an attached latching & gripping assembly 62 happens to be desirable because the said assembly 62 also provides a convenient way to transport the injection tube assembly 100 from the apparatus 200 to a separate Injection molding Apparatus 400 and removably secure it therein after the material 61 is mixed in the injection tube 1, which will be further described later.

The mixing apparatus illustrated in FIG. 13 is constructed according to embodiment 300B for simplicity and ease of viewing, and comprises a mixing element 45, a shaft 46, and a handle 47. However the mixing apparatus constructed according to 300A or 300C are also suitable for use in the system 500.

In any event, with the assembly 100, the apparatus 200 and the apparatus 300 provided in their desired embodiments, and with said assembly 100 removably secured into the apparatus 200. The desired temperature necessary to mix the materials 61 in the tube 1 is then set via the ECD 33. Obviously, if the desired temperature to mix the materials is room temperature, it would not be required to set the temperature of the ECD 33. Furthermore, if desired, the temperature could alternatively be pre-set before securing the assembly 100 in the apparatus 200. When the assembly 100 is secured in the slot 41, the stopper element 43 comes in close communication the orifice 11 of the nozzle 10 to prevent any materials 61 from escaping the tube 1 during the mixing operation. However, if the assembly 100 already comprises its own means for blocking off the nozzle 10 orifice 11, such as a flexible element 16 with the slit 15 bonded thereto, as previously described, then the need for the stopper element 43 may be obviated.

Figure 14:
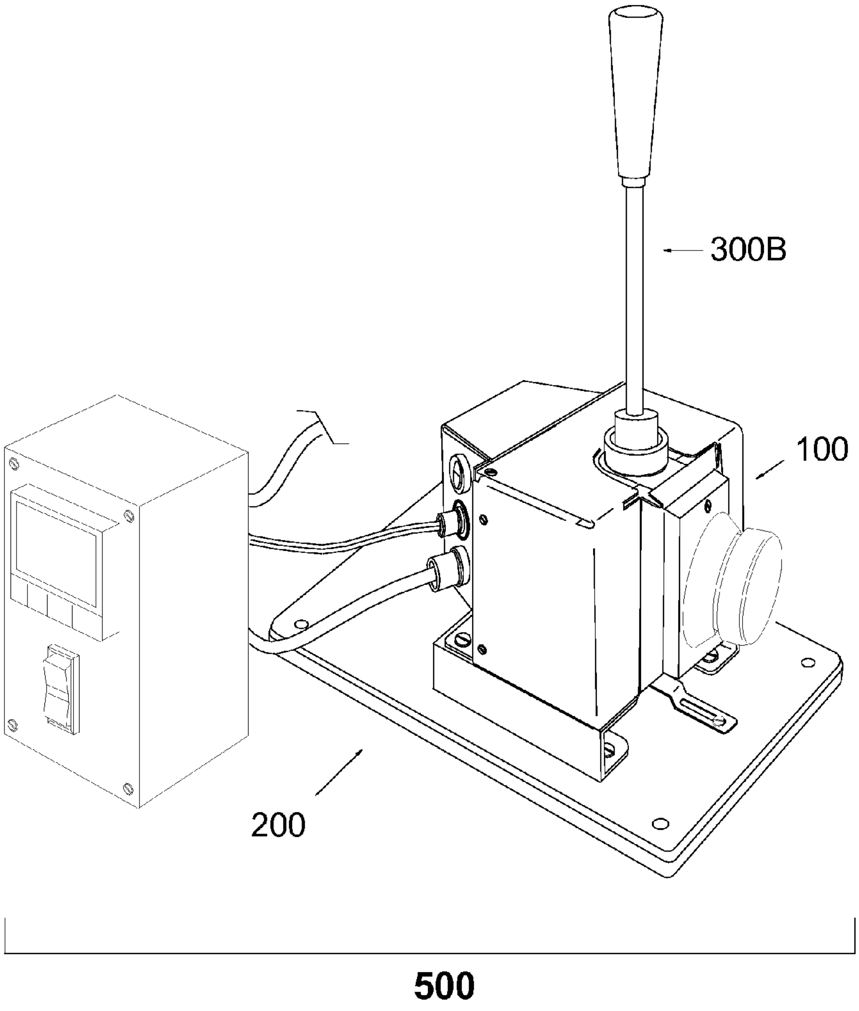
FIG. 14 illustrates an isometric view of a system in one embodiment.

The mixing element 45 of the mixing apparatus 300B is then inserted through the slotted hole 17 of the material stripping element 6 and into the tube 1 to mix the material 61 contained therein, which in this case is accomplished simply by the user manually rotating the handle 47 of the said apparatus 300B. As the mixing element 45 rotates, the stripping element 6 rotates along with it. FIG. 14 illustrates the injection tube assembly 100 secured in apparatus 200 with the mixing element 45 (not visible) of apparatus 300B now inserted into the tube 1.

After the material 61 is mixed, the element 45 is withdrawn from the tube 1 by the user simply by pulling up on the apparatus 300B. As the element 45 retracts through the slotted hole 17 of the stripping element 6, whatever material 61 residue there remains sticking to the said element 45 is substantially stripped off by the stripping element 6, leaving it inside the tube 1. This is because the geometry of the slot 17 closely matches the geometry of the mixing element 45, so very little excess material 61 will be pulled through the said slot 17.

After the mixing element 45 is completely withdrawn from the tube 1, the mixing apparatus 300B is set aside by the user.

At this point the injection tube assembly 100 is typically removed from the apparatus 200 to perform some secondary external function with the now mixed material 61 in the tube 1. For example, the material 61 may be examined under a microscope or placed in some other piece of lab equipment for analysis.

However, in some instances it may be desirable to produce an injection molded part with the mixed material 61, such as a ASTM tensile test bar, an Izod impact test bar, or any other part or prototype desirable for testing and/or evaluation. In these instances the injection molding apparatus 400 disclosed herein may also be employed within the present system 500.

Figure 15:
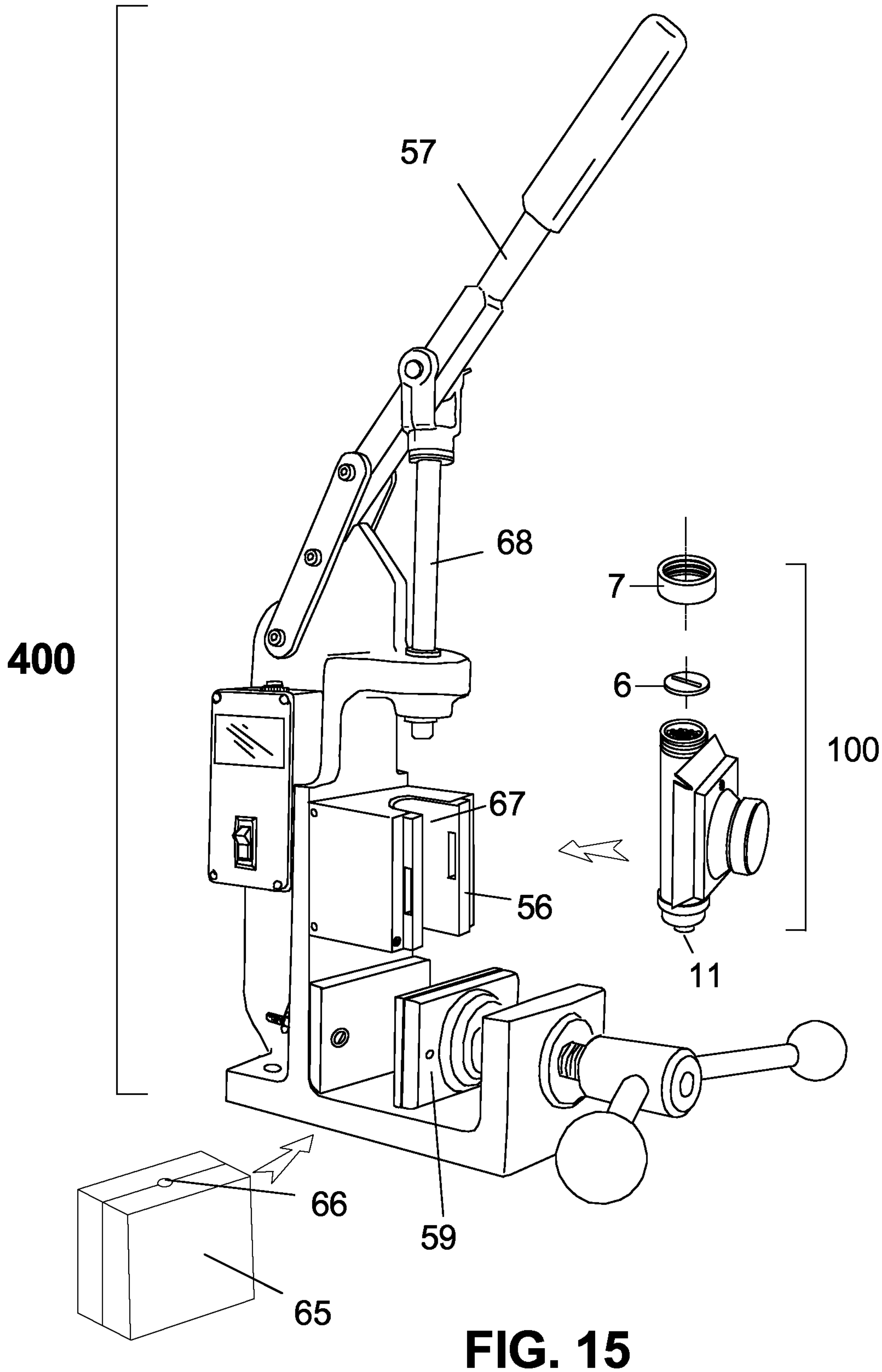
FIG. 15 illustrates an isometric view of an injection molding apparatus in one embodiment, with the injection tube assembly removed.

Accordingly, as illustrated in FIG. 15, in one embodiment of the system 500 after the injection tube assembly 100 is removed from the support apparatus 200, the user removes end cap 7 and the material stripping element 6 from the injection tube 1, then inserts the said assembly 100 into the receiving slot 67 of the heating and injection unit assembly 56 of the injection molding apparatus 400 and interlocks it therewith by turning the knob 64.

A desired mold 65 is then secured in the injection molding apparatus 400 with the clamping means 59, and is aligned so the sprue hole 66 in the top surface of the mold 65 is directly underneath the nozzle orifice 11 of the injection tube assembly 100. The handle 57 is then pulled down by the user causing the injection ram 68 to enter into the tube 1 and force the mixed material 61 out of the nozzle orifice 11 and into the mold 65, filling the mold cavity. The mold 65 is then unclamped from the apparatus 400 and removed. The injection molded part is then removed from the mold 65 by hand.

In an alternative embodiment of the system 500, rather than removing the cap 7 and stripping element 6 from the tube 1 before the assembly 100 is secured in the apparatus 400, they are instead left attached. However, in this embodiment it is likely desirable to employ a material stripping element 6 also of an alternative construction, such as the embodiment illustrated in FIG. 6A with a score line 23 or FIG. 6B with perforations 24. Whereas, in this embodiment, when the injection ram 68 makes contact with the element 6 as the user is pulling down the handle 57, the force against it causes its center portion 21 to break away from its frangible periphery 20, allowing the said center portion to be pushed into the tube 1 as the material 61 is being forced out. The said center portion 21 thereby essentially serves as a plug or at least a barrier to help prevent material from escaping past the ram 68 and out of the top opening of the tube 1 during the injection process. Such an alternative embodiment would typically be desirable where low viscosity materials are being injected, or for materials where it is desirable to minimize their exposure to outside atmosphere.

It shall be appreciated, the embodiments disclosed herein are not a limitation, and other alternative embodiments may be employed without departing from the spirit of the invention. For example, instead of the element 6 having a breakaway frangible periphery 20, the score line 23 could serve to cause the said periphery 20 to flex and fold back under a predetermined amount of force rather than break off, thereby allowing the disc 6 to be pushed into the tube 1 by the ram 68.

Another example is constructing the assembly 100 with at least one element that is not removable, such as integrating the injection nozzle 10 into the tube 1 at the time of manufacture, which may be desirable for a low cost version of the assembly 100 or one that is disposable and intended for only a single use.

As previously mentioned, in an alternative embodiment the stripping element 6 is held captive in an internal groove embodied in the tube 1 located very near its top end 2, thereby eliminating the need for an end cap 7 to hold it captive. Whereas, in one embodiment, the said element 6 is constructed to flex somewhat at least around its outer periphery, allowing it to simply snap in place in the said internal groove of the said tube 1. And then sufficiently flex enough when pressure is applied against it from above with the injection ram 68, such that it pops back out of the said groove, and serves as a plug or barrier during the injection process, thereby preventing low viscosity material 61 from escaping past the ram 68, and also preventing the said ram 68 from coming in direct contact with the material 61 inside the tube 1.

It shall be appreciated; the various alternative embodiments described herein are not the only possibilities, and many other embodiments are also possible within the teachings of the disclosure.

What is claimed is:

1. An injection tube assembly comprising: a hollow cylindrical tube; a nozzle with an orifice at one end of the said tube; a material stripping element held captive at the approximate opposite end of the said tube, the said material stripping element comprising a disc enabled for rotation in its captive location and having at least one through hole that operably accommodates the insertion and withdrawal of a mixing element external from and not integral to the said injection tube assembly, the said at least one through hole comprising geometry optimized for removing material residue from the said mixing element as it is withdrawn and removed from the said tube.

2. The assembly of claim 1, wherein the material stripping element is held captive by means of an internal groove in the tube.

3. The assembly of claim 1, wherein the material stripping element is held captive by means of a cap secured to the tube.

4. The assembly of claim 1, wherein the nozzle with an orifice is embodied in a cap secured to the tube.

5. The assembly of claim 4, wherein the cap further comprises a flexible element with at least one slit covering the nozzle orifice.

6. The assembly of claim 1, wherein the material stripping element is removable from the assembly.

7. The assembly of claim 1, wherein the material stripping element comprises a frangible outer periphery.

8. The assembly of claim 1, wherein the material stripping element is flexible at least around its outer periphery.

9. The assembly of claim 1, wherein at least one portion of the material stripping element is thicker than its outer periphery.

10. The assembly of claim 1, wherein the material stripping element comprises a composite of materials.

11. The assembly of claim 1, wherein the inner portion of the material stripping element is separable from its outer periphery.

12. The assembly of claim 1, wherein the at least one through hole is optimized for receiving a helically shaped mixing element.

13. A polymer mixing system comprising: a mixing apparatus comprising a mixing element; an injection tube assembly comprising a hollow cylindrical tube, a material stripping element enabled for rotation and held captive approximate one end of the said tube, a nozzle with an orifice at the opposite end of the said tube; and a support apparatus configured to receive and secure the injection tube assembly, wherein the injection tube assembly is removably secured in the support apparatus, the mixing element is external from and not integral to the injection tube assembly and is configured to insert through the captive material stripping element and into the said tube to mix material placed therein and then be removed therefrom, the material stripping element is configured to strip material residue from the mixing element as it is withdrawn and removed from the said tube.

14. The system of claim 13, wherein the material stripping element comprises a disc shape.

15. The system of claim 13, wherein the material stripping element rotates as it strips material residue from the mixing element.

16. The system of claim 13, wherein the material stripping element rotates as the mixing element is inserted and withdrawn therethrough.

17. The system of claim 13, wherein the material stripping element rotates during the mixing operation.

18. The system of claim 13, wherein the mixing apparatus comprises a helically shaped blade as the mixing element.

19. The system of claim 13, further comprising: an injection molding apparatus that injects the material from the injection tube assembly after it is mixed.

* * * * *